US010123053B2

(12) United States Patent
Sze et al.

(10) Patent No.: US 10,123,053 B2
(45) Date of Patent: Nov. 6, 2018

(54) ACCELERATION OF BYPASS BINARY SYMBOL PROCESSING IN VIDEO CODING

(75) Inventors: Vivienne Sze, Dallas, TX (US); Madhukar Budagavi, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 969 days.

(21) Appl. No.: 13/478,899

(22) Filed: May 23, 2012

(65) Prior Publication Data

US 2012/0300839 A1   Nov. 29, 2012

Related U.S. Application Data

(60) Provisional application No. 61/488,889, filed on May 23, 2011.

(51) Int. Cl.
| | | |
|---|---|---|
| *H04N 19/463* | (2014.01) | |
| *H04N 19/91* | (2014.01) | |
| *H04N 19/13* | (2014.01) | |
| *H04N 19/61* | (2014.01) | |
| *H04N 19/107* | (2014.01) | |
| *H04N 19/86* | (2014.01) | |

(52) U.S. Cl.
CPC ........... *H04N 19/91* (2014.11); *H04N 19/107* (2014.11); *H04N 19/13* (2014.11); *H04N 19/61* (2014.11); *H04N 19/86* (2014.11)

(58) Field of Classification Search
CPC ........ H04N 7/32; H04N 19/91; H04N 19/117; H04N 19/463; H04N 19/60; H04N 19/86; H04N 19/124; H04N 19/172; H04N 19/176; H04N 19/13; H04N 19/70; H04N 19/103; H04N 19/597; H04N 19/107; H04N 19/159; H04N 19/18; H04N 19/182; H04N 19/61; H04N 19/174; H04N 19/184; H04N 19/16; H04N 19/44
USPC ....................................................... 375/240
See application file for complete search history.

(56) References Cited

U.S. PATENT DOCUMENTS

| | | | |
|---|---|---|---|
| 7,221,296 B2* | 5/2007 | Ziauddin | H03M 7/4006 |
| | | | 341/107 |
| 7,777,654 B2* | 8/2010 | Chang | H03M 7/4006 |
| | | | 341/107 |

(Continued)

OTHER PUBLICATIONS

"Advanced Video Coding for Generic Audiovisual Services", Series H: Audiovisual and Multimedia Systems, ITU-T Recommendation H.264, Telecommunication Standardization Sector of International Communication Union, pp. 1-343, Mar. 2005.

(Continued)

*Primary Examiner* — Dave Czekaj
*Assistant Examiner* — Kehinde O Abimbola
(74) *Attorney, Agent, or Firm* — Gregory J. Albin; Charles A. Brill; Frank D. Cimino

(57) ABSTRACT

A method for encoding a video sequence in a video encoder to generate a compressed video bit stream is provided that includes binarizing a plurality of syntax elements, wherein each binarized syntax element comprises a string of one or more binary symbols (bins), wherein a bin is one selected from a context-coded bin and bypass bin, encoding the context-coded bins of the binarized syntax elements using binary arithmetic encoding, and adding the bypass bins of the binarized syntax elements to the compressed video bit stream with no encoding.

19 Claims, 10 Drawing Sheets

(56) References Cited

U.S. PATENT DOCUMENTS

| | | | | |
|---|---|---|---|---|
| 8,345,767 | B2* | 1/2013 | Nanbu | H03M 7/4006 375/240.03 |
| 8,736,467 | B2* | 5/2014 | Bossen | H03M 7/4018 341/107 |
| 2003/0095203 | A1* | 5/2003 | MacInnis | H04N 7/012 348/441 |
| 2005/0074176 | A1 | 4/2005 | Marpe et al. | |
| 2005/0258982 | A1* | 11/2005 | Pearson et al. | 341/50 |
| 2006/0126744 | A1* | 6/2006 | Peng | H03M 7/4006 375/240.26 |
| 2007/0010990 | A1 | 1/2007 | Woo | |
| 2007/0040711 | A1* | 2/2007 | Ziauddin | H03M 7/4006 341/51 |
| 2009/0096643 | A1* | 4/2009 | Chang | H03M 7/4006 341/51 |
| 2010/0124286 | A1 | 5/2010 | Wang | |
| 2010/0185686 | A1 | 7/2010 | Weigert et al. | |
| 2010/0192167 | A1 | 7/2010 | Feies | |
| 2010/0238998 | A1* | 9/2010 | Nanbu | H03M 7/4006 375/240.03 |
| 2011/0228858 | A1 | 9/2011 | Budagavi et al. | |
| 2012/0102056 | A1 | 4/2012 | Guirard | |
| 2013/0028334 | A1* | 1/2013 | Bossen | H03M 7/4018 375/240.25 |

OTHER PUBLICATIONS

Detlev Marpe et al, "Context-Based Adaptive Binary Arithmetic Coding in the H.264/AVC Video Compression Standard", IEEE Transactions on Circuits and Systems for Video Technology, pp. 620-636, vol. 13, No. 7, Jul. 2003.

Thomas Wiegand et al, "WD3: Working Draft 3 of High-Efficiency Video Coding", JCTVC-E603, Joint Collaborative Team on Video Coding (JCT-VC) of ITU-T SG16 WP3 and ISO/IEC JTC1/SC29/WG11, pp. 1-215, Mar. 16-23, 2011, Geneva, Switzerland.

Benjamin Bross et al, "WD4: Working Draft 4 of High-Efficiency Video Coding", JCTVC-F803_d6, Joint Collaborative Team on Video Coding (JCT-VC) of ITU-T SG16 WP3 and ISO/IEC JTC1/SC29/WG11, pp. 1-229, Jul. 14-22, 2011, Torino, Italy.

Ryoji Hattori et al, "Fast Bypass Mode for CABAC", JCTVC-F177, Joint Collaborative Team on Video Coding (JCT-VC) of ITU-T SG16 WP3 and ISO/IEC JTC1/SC29/WG11, pp. 1-5, Jul. 14-22, 2011, Torino, Italy.

Ryoji Hattori et al, "Fast Bypass Mode for CABAC", JCTVC-F177 Presentation, Joint Collaborative Team on Coding (JCT-VC) of ITU-T SG16 WP3 and ISO/IEC JTC1/SC29/WG11, pp. 1-9, Jul. 14-22, 2011, Torino, Italy.

Vivienne Sze and Madhukar Budagavi, "Parallel Context Processing of Coefficient Level", JCTVC-F130, Joint Collaborative Team on Video Coding (JCT-VC) of ITU-T SG16 WP3 and ISO/IEC JTC1/SC29/WG11, pp. 1-4, Jul. 14-22, 2011, Torino, Italy.

Vivienne Sze and Madhukar Budagavi, "Parallel Context Processing of Coefficient Level", JCTVC-F130 Presentation, Joint Collaborative Team on Video Coding (JCT-VC) of ITU-T SG16 WP3 and ISO/IEC JTC1/SC29/WG11, pp. 1-5, Jul. 13-22, 2011, Torino, Italy.

Benjamin Bross et al, "WD5: Working Draft 5 of High-Efficiency Video Coding", JCTVC-G1103_d9, Joint Collaborative Team on Video Coding (JCT-VC) of ITU-T SG16 WP3 and ISO/IEC JTC1/SC29/WG11, pp. 1-237 Nov. 21-30, 2011, Geneva, Switzerland.

Benjamin Bross et al, "High Efficiency Video Coding (HEVC) Text Specification Draft 6", JCTVC-H1003, Joint Collaborative Team on Video Coding (JCT-VC) of ITU-T SG16 WP3 and ISO/IEC JTC1/SC29/WG11, pp. 1-259, Nov. 21-30, 2011, Geneva, Switzerland.

Benjamin Bross et al, High Efficiency Video Coding (HEVC) Text Specification Draft 7, JCTVC-I1003_d0, Joint Collaborative Team on Video Coding (JCT-VC) of ITU-T SG16 WP3 and ISO/IEC JTC1/SC29/WG11, pp.-1-270, Apr. 27-May 7, 2012, Geneva, Switzerland.

Vivienne Sze and Madhukar Budagavi, "Parallel CABAC for Low Power Video Coding", Proc. of IEEE International Conference on Image Processing, pp. 2096-2099, Oct. 12-15, 2008, San Diego, CA.

Ryoji Hattori et al, "Fast Bypass Mode for CABAC", 2012 Picture Coding Symposium, pp. 417-420, May 7-9, 2012, Krakow, Poland.

"TMS320DM6467 Digital Media System-on-Chip", SPRS403G, Texas Instruments Incorporated, Dec. 2007, revised Oct. 2010, pp. 1-355.

* cited by examiner

ACCELERATION OF BYPASS BINARY SYMBOL PROCESSING IN VIDEO CODING

CROSS-REFERENCE TO RELATED APPLICATIONS

This application claims benefit of U.S. Provisional Patent Application Ser. No. 61/488,889, filed May 23, 2011, which is incorporated herein by reference in its entirety.

BACKGROUND OF THE INVENTION

Field of the Invention

Embodiments of the present invention generally relate to acceleration of bypass binary symbol processing in video coding.

Description of the Related Art

Video compression, i.e., video coding, is an essential enabler for digital video products as it enables the storage and transmission of digital video. In general, video compression techniques apply prediction, transformation, quantization, and entropy coding to sequential blocks of pixels in a video sequence to compress, i.e., encode, the video sequence. Video decompression techniques generally perform the inverse of these operations in reverse order to decompress, i.e., decode, a compressed video sequence.

Context-adaptive binary arithmetic coding (CABAC) is a form of entropy coding used in video encoding. CABAC is an inherently lossless compression technique notable for providing considerably better compression than most other encoding algorithms used in video encoding at the cost of increased complexity. In brief, CABAC has multiple probability modes for different contexts. It first converts all non-binary symbols to binary symbols referred to as bins. Then, for each bin, the coder selects which probability model to use, and uses information from nearby elements to optimize the probability estimate. Arithmetic coding is then applied to compress the data. The theory and operation of CABAC coding for H.264/AVC is defined in the International Telecommunication Union, Telecommunication Standardization Sector (ITU-T) standard "Advanced video coding for generic audiovisual services" H.264, revision March 2005 or later, which is incorporated by reference herein. General principles are explained in "Context-Based Adaptive Binary Arithmetic Coding in the H.264/AVC Video Compression Standard," Detlev Marpe, July 2003, which is incorporated by reference herein.

CABAC is a well known throughput bottleneck in video codec implementations (particularly on the decoder side) due to the many feedback loops used. Further, the feedback loops make CABAC difficult to parallelize, which makes it difficult to achieve the high throughput necessary for high resolution and frame-rate videos. Furthermore, since high throughput can be traded-off for power savings using voltage scaling, the serial nature of CABAC limits the battery life for video codecs that reside on mobile devices. This limitation is a critical concern, as a significant portion of the future video codecs will be used on battery-operated devices.

SUMMARY

Embodiments of the present invention relate to methods and apparatus for acceleration of bypass binary symbol processing in video coding. In one aspect, a method for encoding a video sequence in a video encoder to generate a compressed video bit stream is provided that includes binarizing a plurality of syntax elements, wherein each binarized syntax element comprises a string of one or more binary symbols (bins), wherein a bin is one selected from a context-coded bin and bypass bin, encoding the context-coded bins of the binarized syntax elements using binary arithmetic encoding, and adding the bypass bins of the binarized syntax elements to the compressed video bit stream with no encoding.

In one aspect, a method for decoding a compressed video bit stream in a video decoder is provided that includes determining a type of a syntax element encoded in the compressed bit stream, wherein the encoded syntax element comprises a plurality of context-coded binary symbols (bins) and a plurality of bypass bins, reading the plurality of bypass bins from the compressed video bit stream with no decoding, decoding the plurality of context-coded bins from the compressed video bit stream using binary arithmetic decoding, and debinarizing the plurality of context-coded bins and the plurality of bypass bins to regenerate the syntax element.

In one aspect, a video coding apparatus is provided that includes a processing unit, and a memory coupled to the processor, wherein the memory is configured to store software instructions that, when executed by the processing unit cause the apparatus to perform a method that includes binarizing a plurality of syntax elements, wherein each binarized syntax element comprises a string of one or more binary symbols (bins), wherein a bin is one selected from a context-coded bin and bypass bin, encoding the context-coded bins of the binarized syntax elements using binary arithmetic encoding, and adding the bypass bins of the binarized syntax elements to a compressed video bit stream with no encoding.

BRIEF DESCRIPTION OF THE DRAWINGS

Particular embodiments will now be described, by way of example only, and with reference to the accompanying drawings.

DETAILED DESCRIPTION OF EMBODIMENTS OF THE INVENTION

Figure 1A:
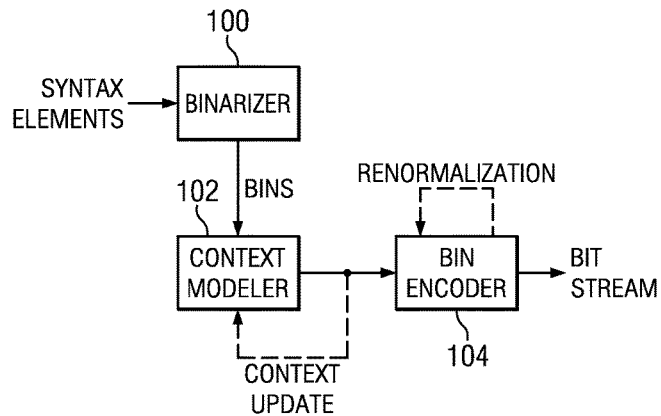
FIGS. 1A-1C are block diagrams illustrating CABAC encoding and decoding.

Specific embodiments of the invention will now be described in detail with reference to the accompanying figures. Like elements in the various figures are denoted by like reference numerals for consistency.

As used herein, the term "picture" may refer to a frame or a field of a frame. A frame is a complete image captured during a known time interval. The Joint Collaborative Team on Video Coding (JCT-VC) of ITU-T WP3/16 and ISO/IEC JTC 1/SC 29/WG 11 is currently developing the next-generation video coding standard referred to as High Efficiency Video Coding (HEVC). HEVC is expected to provide around 50% improvement in coding efficiency over the current standard, H.264/AVC, as well as larger resolutions and higher frame rates. For convenience of description, some embodiments of the invention are described herein in reference to HEVC and use terminology from HEVC. One of ordinary skill in the art will understand that embodiments of the invention are not limited to HEVC.

Various versions of HEVC are described in the following documents, which are incorporated by reference herein: T. Wiegand, et al., "WD3: Working Draft 3 of High-Efficiency Video Coding," JCTVC-E603, Joint Collaborative Team on Video Coding (JCT-VC) of ITU-T SG16 WP3 and ISO/IEC JTC1/SC29/WG11, Geneva, CH, Mar. 16-23, 2011 ("WD3"), B. Bross, et al., "WD4: Working Draft 4 of High-Efficiency Video Coding, JCTVC-F803_d6, Joint Collaborative Team on Video Coding (JCT-VC) of ITU-T SG16 WP3 and ISO/IEC JTC1/SC29/WG11, Torino, IT, Jul. 14-22, 2011 ("WD4"), B. Bross. et al., "WD5: Working Draft 5 of High-Efficiency Video Coding, JCTVC-G1103_d9, Joint Collaborative Team on Video Coding (JCT-VC) of ITU-T SG16 WP3 and ISO/IEC JTC1/SC29/WG11, Geneva, CH, Nov. 21-30, 2011 ("WD5"), B. Bross, et al., "High Efficiency Video Coding (HEVC) Text Specification Draft 6, JCTVC-H1003, Joint Collaborative Team on Video Coding (JCT-VC) of ITU-T SG16 WP3 and ISO/IEC JTC1/SC29/WG1, Geneva, CH, Nov. 21-30, 2011 ("HEVC Draft 6"), and B. Bross, et al., "High Efficiency Video Coding (HEVC) Text Specification Draft 7, JCTVC-I1003_d0, Joint Collaborative Team on Video Coding (JCT-VC) of ITU-T SG16 WP3 and ISO/IEC JTC1/SC29/WG1, Geneva, CH, Apr. 17-May 7, 2012 ("HEVC Draft 7"). Each of these documents describes CABAC coding.

In HEVC, a largest coding unit (LCU) is the base unit used for block-based coding. A picture is divided into non-overlapping LCUs. That is, an LCU plays a similar role in coding as the macroblock of H.264/AVC, but it may be larger, e.g., 32×32, 64×64, etc. An LCU may be partitioned into coding units (CU). A CU is a block of pixels within an LCU and the CUs within an LCU may be of different sizes. The partitioning is a recursive quadtree partitioning. The quadtree is split according to various criteria until a leaf is reached, which is referred to as the coding node or coding unit. The maximum hierarchical depth of the quadtree is determined by the size of the smallest CU (SCU) permitted. The coding node is the root node of two trees, a prediction tree and a transform tree. A prediction tree specifies the position and size of prediction units (PU) for a coding unit. A transform tree specifies the position and size of transform units (TU) for a coding unit. A transform unit may not be larger than a coding unit and the size of a transform unit may be, for example, 4×4, 8×8, 16×16, 32×32, 4×16, 16×4, 8×32, and 32×8. The sizes of the transforms units and prediction units for a CU are determined by the video encoder during prediction based on minimization of rate/distortion costs.

Figure 1B:
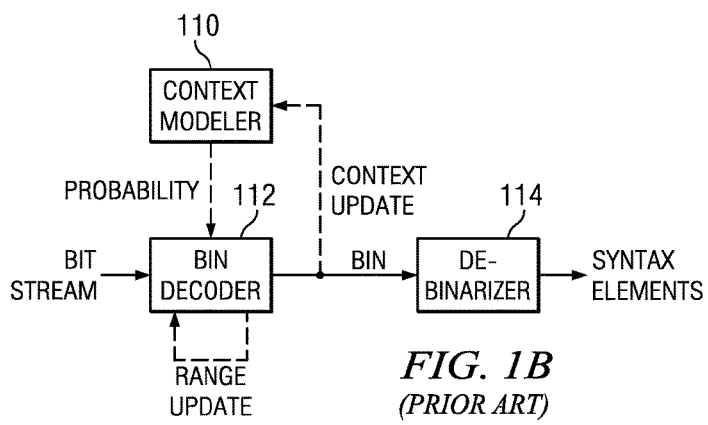

As was previously mentioned, context-adaptive binary arithmetic coding (CABAC) is a well known throughput bottleneck in the implementation of video codecs due to the feedback loops involved. FIGS. 1A and 1B are block diagrams illustrating the three key components of, respectively, CABAC encoding and CABAC decoding. The feedback loops are highlighted as dashed lines. Referring now to FIG. 1A, a CABAC encoder includes a binarizer 100, a context modeler 102, and a bin encoder 104. The binarizer 100 converts syntax elements into strings of one or more binary symbols referred to as bins. In general, a syntax element is an element of data produced by the video encoding process. For example, a syntax element may be a motion vector difference, a prediction mode, a coefficient level, a flag, a reference index, etc. The syntax elements are defined by HEVC.

The binarization of a syntax element is also defined by HEVC, i.e., the standard dictates the content of the binary symbol string for each syntax element. That is, HEVC defines a binarization scheme with unique mappings of syntax elements to sequences of bins. Examples of binarization include unary coding, truncated unary coding, exp-Golomb coding, and fixed length coding. Further, as part of binarization, a bin index (binIdx) is generated which indicates the location of the bin within the syntax element; the bin index in conjunction with the context selection logic indicates whether a bin may be classified as a regular (context-coded) bin or an equal probability (bypass) bin. Whether a particular bin is to be classified as context-coded or bypass is also defined by HEVC. Context-coded and bypass bins are explained in more detail below.

The context modeler 102 selects a context model for a context-coded bin. HEVC defines the available context models, the initial values of the context models, and which context model(s) should be used for bins of each syntax element. A context model includes a state value and a binary value of the most probable symbol MPS. The context models are updated throughout the coding process to track the probability estimations. That is, a bin is encoded based on the current state of the context model selected by the context modeler 102, and the context model is then updated to reflect the state transition and the MPS after the bin is coded. This updating corresponds to the feedback loop labeled "context update" in FIG. 1A.

The bin encoder 104 performs binary arithmetic coding of a bin using the context model (probability) selected by the context modeler 102. Binary arithmetic coding is based on the principle of recursive interval subdivision of an interval of width R. The current interval for each recursion, i.e., the internal state of the arithmetic coding, is represented by its lower bound L and its width (range) R. In HEVC, the lower bound L is referred as codILow, the range R is referred to as codIRange, the precision for storage of L is 10 bits, and the bit precision for storage of R is 9 bits. For each bin to be encoded, the current interval is subdivided into two subintervals, an interval of width $R_{LPS}=R*p_{LPS}$ and an interval of width $R_{MPS}=R-R_{LPS}$, where $p_{LPS}$ is an estimate of the probability of the least probable symbol (LPS), and MPS is the most probable symbol, with a probability of $1-p_{LPS}$. The value of $p_{LPS}$ is determined using the state value of the context model. Depending on whether the bin is the LPS or MPS, the corresponding subinterval is selected as the interval for the next bin.

The lower bound L and the range R are updated according to the lower bound and range of the selected subinterval. A renormalization process is then executed to rescale the lower bound L and the range R if needed. The renormalization process iteratively scales the range R to a minimum value of 256 with successive left shifts by 1 and may take from zero to 8 iterations depending on the value of the range R. In each iteration, the lower bound L is also scaled and a single output bit is generated to be added to the encoded bit stream. The polarity of the output bit is determined by the value of the lower bound L at each iteration. However, in certain cases, the polarity of an output bit may need to be resolved in subsequent iterations or in renormalization after coding one or more subsequent bins, i.e., carry propagation may occur. Such bits are referred to as outstanding bits. A count is kept of these outstanding bits and they are output when a future output bit resolves them to a known value. Thus, 0 to 8 output bits may be generated during renormalization plus any outstanding bits may also be output. The renormalization process corresponds to the feedback loop labeled "renormalization" in FIG. 1A.

The CABAC decoding process is the inverse of the encoding process and has similar feedback loops. Referring now to FIG. 1B, a CABAC decoder includes a bin decoder 112, a context modeler 110, and a de-binarizer 114. The context modeler 110 selects a context model for the next context-coded bin to be decoded. As in the encoder, the context models are updated throughout the decoding process to track the probability estimations. That is, a bin is decoded based on the current state of the context model selected by the context modeler 110, and the context model is then updated to reflect the state transition and the MPS after the bin is decoded. This updating corresponds to the feedback loop labeled "context update" in FIG. 1B.

The bin decoder 112 performs binary arithmetic decoding of a bin using the context model selected by the context modeler 110. Binary arithmetic decoding, like binary arithmetic encoding, is based on the principle of recursive interval subdivision of an interval of width (range) R. The internal state of the arithmetic decoding for each recursion is represented by the range R and an offset O used to select the correct subinterval for a bin. In HEVC, the range R is referred to as codIRange, the offset is referred to as codIOffset, and the precision of R and O is 9 bits. The offset is the top 9 bits of the bit stream at each recursion. A decoded bin is output at each recursion.

To decode a bin, the current interval is subdivided into two subintervals, an interval of width $R_{LPS}=R*p_{LPS}$ and an interval of width $R_{MPS}=R-R_{LPS}$, where $p_{LPS}$ is an estimate of the probability of the least probable symbol (LPS), and MPS is the most probable symbol, with a probability of $1-p_{LPS}$. The value of $p_{LPS}$ is determined using the state value of the context model. If the offset falls in the subinterval $R_{LPS}$, the bin is decoded as the LPS and the subinterval is selected as the interval for decoding the next bin; otherwise, the bin is decoded as the MPS and $R_{MPS}$ is selected as the interval for decoding the next bin.

The range R is updated to be the selected subinterval. A renormalization process is then executed to rescale the range R and update the offset O if needed. The renormalization process iteratively scales the range R to a minimum value of 256 with successive left shifts by 1. The number of iterations needed depends on the value of the range R. In each iteration, the offset O is also left shifted by 1 and the next bit in the bit stream is shifted into the offset. The renormalization process corresponds to the feedback loop labeled "range update" in FIG. 1B.

The de-binarizer 114 receives the decoded bins and operates to reverse the binarization of the binarizer 100 to reconstruct syntax elements.

Figure 1C:
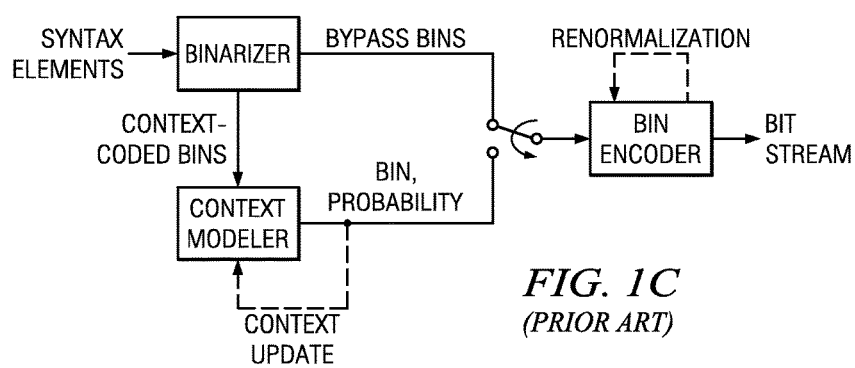

As was previously mentioned, a bin may be a context-coded bin or a bypass bin. Context-coded bins are coded according to the full context modeling process. However, bypass bins have an assumed fixed probability of 0.5, which means that 0 and 1 occur in equal probability. Such bins are encoded and decoded in a bypass mode that skips the context modeling, and thus the feedback loop involved in the modeling. In addition, the arithmetic encoding and arithmetic decoding are simplified, as is the renormalization. FIG. 1C illustrates this bypass mode in the encoder.

In HEVC, some syntax elements are composed of both context-coded and bypass bins and some syntax elements are composed of all bypass bins. For example, in HEVC draft 7, the first bin is a context-coded bin and the rest of the bins are bypass bins for the partition mode (part_mode) and the merge index (merge_idx). Further, all of bins of the remainder intra-prediction mode (rem_intra_luma_pred_mode), the sign of the motion vector difference (mvd_sign_flag), and the most probable intra prediction mode index (mpm_idx) are bypass bins. In addition, the first two bins are context-coded bins and the rest of the bins are bypass bins for the motion vector difference (abs_mvd_greater0_flag, abs_mvd_greater1_flag, abs_mvd_minus2) and the coefficient level (coeff_abs_level_greater1_flag, coeff_abs_level_greater2_flag, coeff_abs_level_remaining). For the X and Y coordinates of the last coefficient position in a transform, (last_significant_coeff_x_prefix, last_significant_coeff_x_suffix, last_significant_coeff_y_prefix, last_significant_coeff_y_suffix), the prefix is context-coded bins and the suffix is bypass bins. Note that the terms in parenthesis are the names assigned to the particular syntax elements in HEVC draft 7.

Further, in HEVC, the maximum number of context-code bins is reduced relative to previous video coding standards. For example, only a maximum of two context-coded bins are used to represent the coefficient level syntax element in HEVC, while fourteen context-coded bins are used for the coefficient level syntax element in H.264/AVC. In the worst cases, there are significantly more bypass bins than context-coded bins. Accordingly, when there are a large number of bins per frame, a majority of the bins will be bypass bins. Thus, entropy coding and decoding speed would be improved if the processing of bypass bins is accelerated.

While encoding/decoding of bypass bins in the prior art bypass mode avoids the feedback loop for context modeling, the number of bypass bins that can be processed per cycles is still limited by the renormalization feedback loop in the arithmetic encoder/decoder. In particular, in this feedback loop in the decoder, the range R is subtracted from the offset O when the offset O is greater than the range R. This subtraction increases the time needed for decoding bypass bins. In the feedback loop in the encoder, when the bypass bin has a value of one, the range R is added to lower bound L. This addition increases the time needed for encoding bypass bins.

Embodiments of the invention provide for acceleration of the bypass mode for CABAC encoding and decoding. More specifically, in embodiments of the invention, the bypass mode is changed to bypass both context modeling and arithmetic coding/decoding. Instead, the bypass bins output from binarization are directly written into the compressed video bit stream by the encoder and are directly read from the compressed video bit stream by the decoder and passed for de-binarization. In some embodiments, a multiplexing scheme is provided for combining sub-streams of the output of the arithmetic coding of the context-coded bins with the bypass bins to form the encoded bit stream. In some embodiments, the bypass bins and the output of the arithmetic coding of the context-bins, i.e., the encoded context-coded bins, are stored in separate bit streams.

Figure 2:
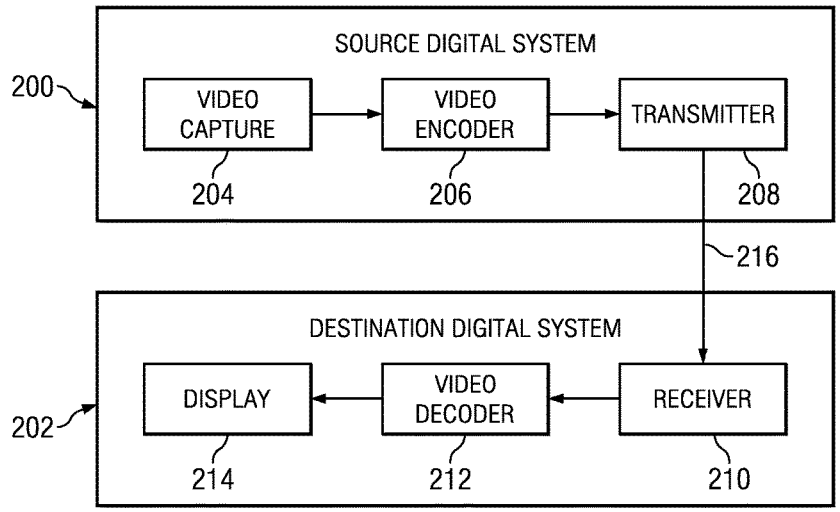
FIG. 2 is a block diagram of a digital system.

FIG. 2 shows a block diagram of a digital system that includes a source digital system 200 that transmits encoded video sequences to a destination digital system 202 via a communication channel 216. The source digital system 200 includes a video capture component 204, a video encoder component 206, and a transmitter component 208. The video capture component 204 is configured to provide a video sequence to be encoded by the video encoder component 206. The video capture component 204 may be, for example, a video camera, a video archive, or a video feed from a video content provider. In some embodiments, the video capture component 204 may generate computer graphics as the video sequence, or a combination of live video, archived video, and/or computer-generated video.

The video encoder component 206 receives a video sequence from the video capture component 204 and encodes it for transmission by the transmitter component 208. The video encoder component 206 receives the video sequence from the video capture component 204 as a sequence of pictures, divides the pictures into largest coding units (LCUs), and encodes the video data in the LCUs. The video encoder component 206 may be configured to perform CABAC encoding with accelerated bypass bin processing during the encoding process as described herein. An embodiment of the video encoder component 206 is described in more detail herein in reference to FIG. 3.

The transmitter component 208 transmits the encoded video data to the destination digital system 202 via the communication channel 216. The communication channel 216 may be any communication medium, or combination of communication media suitable for transmission of the encoded video sequence, such as, for example, wired or wireless communication media, a local area network, or a wide area network.

The destination digital system 202 includes a receiver component 210, a video decoder component 212 and a display component 214. The receiver component 210 receives the encoded video data from the source digital system 200 via the communication channel 216 and provides the encoded video data to the video decoder component 212 for decoding. The video decoder component 212 reverses the encoding process performed by the video encoder component 206 to reconstruct the LCUs of the video sequence. The video decoder component 212 may be configured to perform CABAC decoding with accelerated bypass bin processing during the decoding process as described herein. An embodiment of the video decoder component 212 is described in more detail below in reference to FIG. 4.

The reconstructed video sequence is displayed on the display component 214. The display component 214 may be any suitable display device such as, for example, a plasma display, a liquid crystal display (LCD), a light emitting diode (LED) display, etc.

In some embodiments, the source digital system 200 may also include a receiver component and a video decoder component and/or the destination digital system 202 may include a transmitter component and a video encoder component for transmission of video sequences both directions for video steaming, video broadcasting, and video telephony. Further, the video encoder component 206 and the video decoder component 212 may perform encoding and decoding in accordance with one or more video compression standards. The video encoder component 206 and the video decoder component 212 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 3:
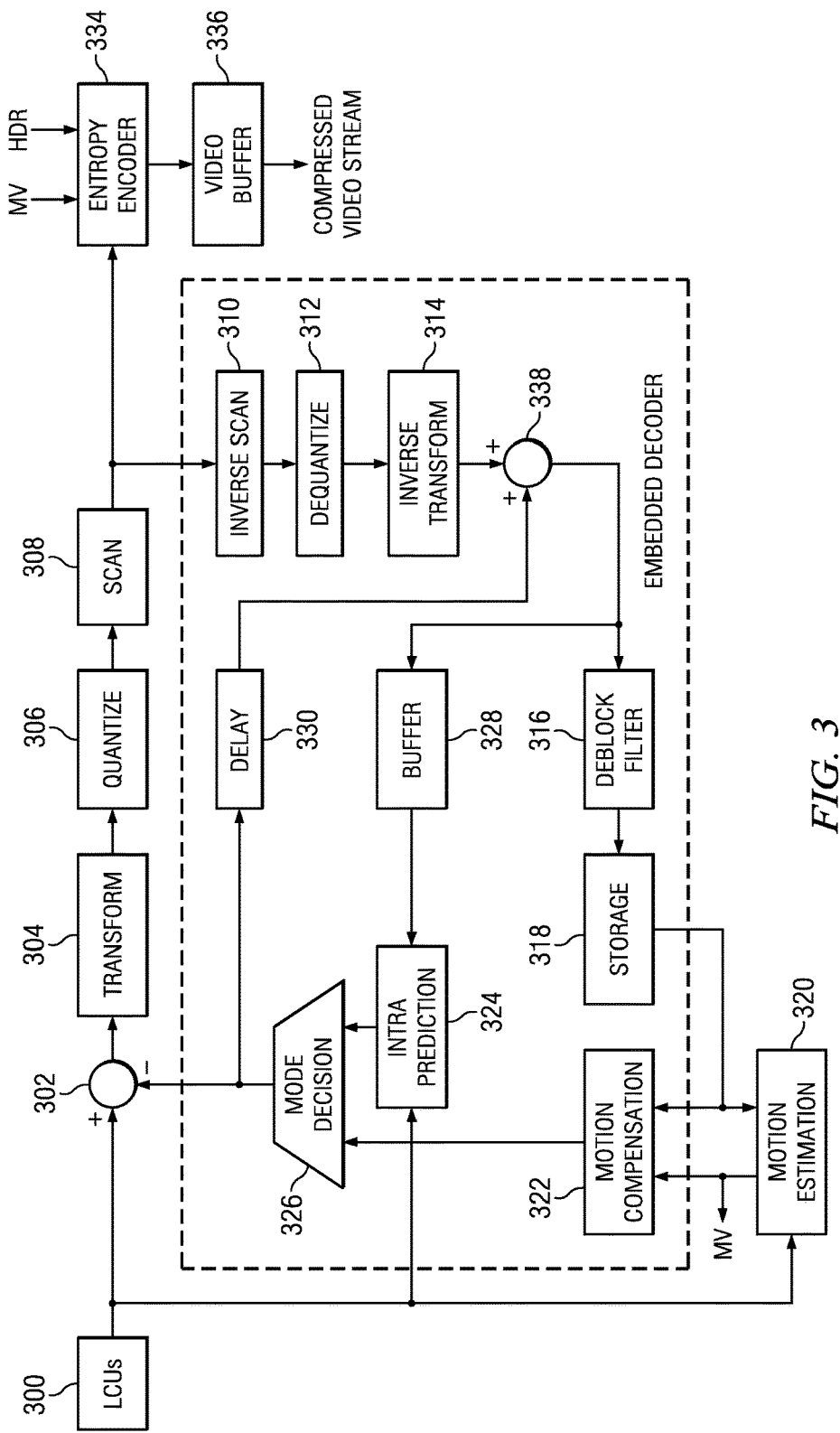
FIG. 3 is a block diagram of a video encoder.

FIG. 3 shows a block diagram of the LCU processing portion of an example video encoder. A coding control component (not shown) sequences the various operations of the LCU processing, i.e., the coding control component runs the main control loop for video encoding. The coding control component receives a digital video sequence and performs any processing on the input video sequence that is to be done at the picture level, such as determining the coding type (I, P, or B) of a picture based on the high level coding structure, e.g., IPPP, IBBP, hierarchical-B, and dividing a picture into LCUs for further processing. The coding control component also may determine the initial LCU CU structure for each CU and provides information regarding this initial LCU CU structure to the various components of the video encoder as needed. The coding control component also may determine the initial PU and TU structure for each CU and provides information regarding this initial structure to the various components of the video encoder as needed.

In addition, for pipelined architectures in which multiple PUs and CUs may be processed concurrently in different components of the LCU processing, the coding control component controls the processing of PUs and CUs by various components of the LCU processing in a pipeline fashion. For example, in many embedded systems supporting video processing, there may be one master processor and one or more slave processing modules, e.g., hardware accelerators. The master processor operates as the coding control component and runs the main control loop for video encoding, and the slave processing modules are employed to off load certain compute-intensive tasks of video encoding such as motion estimation, motion compensation, intra prediction mode estimation, transformation and quantization, entropy coding, and loop filtering. The slave processing modules are controlled in a pipeline fashion by the master processor such that the slave processing modules operate on different blocks of a picture at any given time. That is, the slave processing modules are executed in parallel, each processing its respective block while data movement from one processor to another is serial.

The LCU processing receives LCUs of the input video sequence from the coding control component and encodes the LCUs under the control of the coding control component to generate the compressed video stream. The CUs in the CU structure of an LCU may be processed by the LCU processing in a depth-first Z-scan order. The LCUs 300 from the coding control unit are provided as one input of a motion estimation component 320, as one input of an intra-prediction component 324, and to a positive input of a combiner 302 (e.g., adder or subtractor or the like). Further, although not specifically shown, the prediction mode of each picture as selected by the coding control component is provided to a mode selector component and the entropy encoder 334.

The storage component 318 provides reference data to the motion estimation component 320 and to the motion compensation component 322. The reference data may include one or more previously encoded and decoded CUs, i.e., reconstructed CUs.

The motion estimation component 320 provides motion data information to the motion compensation component 322 and the entropy encoder 334. More specifically, the motion estimation component 320 performs tests on CUs in an LCU based on multiple inter-prediction modes (e.g., skip mode, merge mode, and normal or direct inter-prediction) and transform block sizes using reference picture data from storage 318 to choose the best motion vector(s)/prediction mode based on a rate distortion coding cost. To perform the tests, the motion estimation component 320 may begin with the CU structure provided by the coding control component. The motion estimation component 320 may divide each CU indicated in the CU structure into PUs according to the unit sizes of prediction modes and into transform units according to the transform block sizes and calculate the coding costs for each prediction mode and transform block size for each CU. The motion estimation component 320 may also compute CU structure for the LCU and PU/TU partitioning structure for a CU of the LCU by itself.

For coding efficiency, the motion estimation component 320 may also decide to alter the CU structure by further partitioning one or more of the CUs in the CU structure. That is, when choosing the best motion vectors/prediction modes, in addition to testing with the initial CU structure, the motion estimation component 320 may also choose to divide the larger CUs in the initial CU structure into smaller CUs (within the limits of the recursive quadtree structure), and calculate coding costs at lower levels in the coding hierarchy. If the motion estimation component 320 changes the initial CU structure, the modified CU structure is communicated to other components that need the information.

The motion estimation component 320 provides the selected motion vector (MV) or vectors and the selected prediction mode for each inter-predicted PU of a CU to the motion compensation component 322 and the selected motion vector (MV), reference picture index (indices), prediction direction (if any) to the entropy encoder 334

The motion compensation component 322 provides motion compensated inter-prediction information to the mode decision component 326 that includes motion compensated inter-predicted PUs, the selected inter-prediction modes for the inter-predicted PUs, and corresponding transform block sizes. The coding costs of the inter-predicted PUs are also provided to the mode decision component 326.

The intra-prediction component 324 provides intra-prediction information to the mode decision component 326 that includes intra-predicted PUs and the corresponding intra-prediction modes. That is, the intra-prediction component 324 performs intra-prediction in which tests based on multiple intra-prediction modes and transform unit sizes are performed on CUs in an LCU using previously encoded neighboring PUs from the buffer 328 to choose the best intra-prediction mode for each PU in the CU based on a coding cost.

To perform the tests, the intra-prediction component 324 may begin with the CU structure provided by the coding control. The intra-prediction component 324 may divide each CU indicated in the CU structure into PUs according to the unit sizes of the intra-prediction modes and into transform units according to the transform block sizes and calculate the coding costs for each prediction mode and transform block size for each PU. For coding efficiency, the intra-prediction component 324 may also decide to alter the CU structure by further partitioning one or more of the CUs in the CU structure. That is, when choosing the best prediction modes, in addition to testing with the initial CU structure, the intra-prediction component 324 may also chose to divide the larger CUs in the initial CU structure into smaller CUs (within the limits of the recursive quadtree structure), and calculate coding costs at lower levels in the coding hierarchy. If the intra-prediction component 324 changes the initial CU structure, the modified CU structure is communicated to other components that need the information. Further, the coding costs of the intra-predicted PUs and the associated transform block sizes are also provided to the mode decision component 326.

The mode decision component 326 selects between the motion-compensated inter-predicted PUs from the motion compensation component 322 and the intra-predicted PUs from the intra-prediction component 324 based on the coding costs of the PUs and the picture prediction mode provided by the mode selector component. The decision is made at CU level. Based on the decision as to whether a CU is to be intra- or inter-coded, the intra-predicted PUs or inter-predicted PUs are selected, accordingly.

The output of the mode decision component 326, i.e., the predicted PU, is provided to a negative input of the combiner 302 and to a delay component 330. The associated transform block size is also provided to the transform component 304. The output of the delay component 330 is provided to another combiner (i.e., an adder) 338. The combiner 302 subtracts the predicted PU from the current PU to provide a residual PU to the transform component 304. The resulting residual PU is a set of pixel difference values that quantify differences between pixel values of the original PU and the predicted PU. The residual blocks of all the PUs of a CU form a residual CU block for the transform component 304.

The transform component 304 performs block transforms on the residual CU to convert the residual pixel values to transform coefficients and provides the transform coefficients to a quantize component 306. The transform component 304 receives the transform block sizes for the residual CU and applies transforms of the specified sizes to the CU to generate transform coefficients.

The quantize component 306 quantizes the transform coefficients based on quantization parameters (QPs) and quantization matrices provided by the coding control component and the transform sizes. The quantized transform coefficients are taken out of their scan ordering by a scan component 308 and arranged sequentially for entropy coding. In essence, the scan component 308 scans backward through the coefficients of the transform block to serialize the coefficients for entropy coding. A large region of a transform block in the higher frequencies is typically zero. The scan component 308 does not send such large regions of zeros in transform blocks for entropy coding. Rather, the scan component 308 may start with the highest frequency position in the transform block and scans the coefficients backward in highest to lowest frequency order until a coefficient with a non-zero value is located. Once the first coefficient with a non-zero value is located, that coefficient and all remaining coefficient values following the coefficient in the highest to lowest frequency scan order are serialized and passed to the entropy encoder 334.

The entropy encoder 334 entropy encodes the relevant data, i.e., syntax elements, output by the various encoding components and the coding control component to generate the compressed video bit stream. The syntax elements are encoded according to the syntactical order specified in HEVC. This syntactical order specifies the order in which syntax elements should occur in a compressed video bit stream. The entropy encoder 334 encodes the syntax elements using an embodiment of CABAC encoding with accelerated bypass bin processing as described herein.

The LCU processing includes an embedded decoder. As any compliant decoder is expected to reconstruct an image from a compressed bit stream, the embedded decoder provides the same utility to the video encoder. Knowledge of the reconstructed input allows the video encoder to transmit the appropriate residual energy to compose subsequent pictures. To determine the reconstructed input, i.e., reference data, the ordered quantized transform coefficients for a CU provided via the scan component 308 are returned to their original post-transform arrangement by an inverse scan component 310, the output of which is provided to a dequantize component 312, which outputs a reconstructed version of the transform result from the transform component 304.

The dequantized transform coefficients are provided to the inverse transform component 314, which outputs estimated residual information which represents a reconstructed version of a residual CU. The inverse transform component 314 receives the transform block size used to generate the transform coefficients and applies inverse transform(s) of the specified size to the transform coefficients to reconstruct the residual values.

The reconstructed residual CU is provided to the combiner 338. The combiner 338 adds the delayed selected CU to the reconstructed residual CU to generate an unfiltered reconstructed CU, which becomes part of reconstructed picture information. The reconstructed picture information is provided via a buffer 328 to the intra-prediction component 324 and to an in-loop filter component 316. The in-loop filter component 316 applies various filters to the reconstructed picture information to improve the reference picture used for encoding/decoding of subsequent pictures. The in-loop filter component 316 may, for example, adaptively apply low-pass filters to block boundaries according to the boundary strength to alleviate blocking artifacts causes by the block-based video coding. The filtered reference data is provided to storage component 318.

Figure 4:
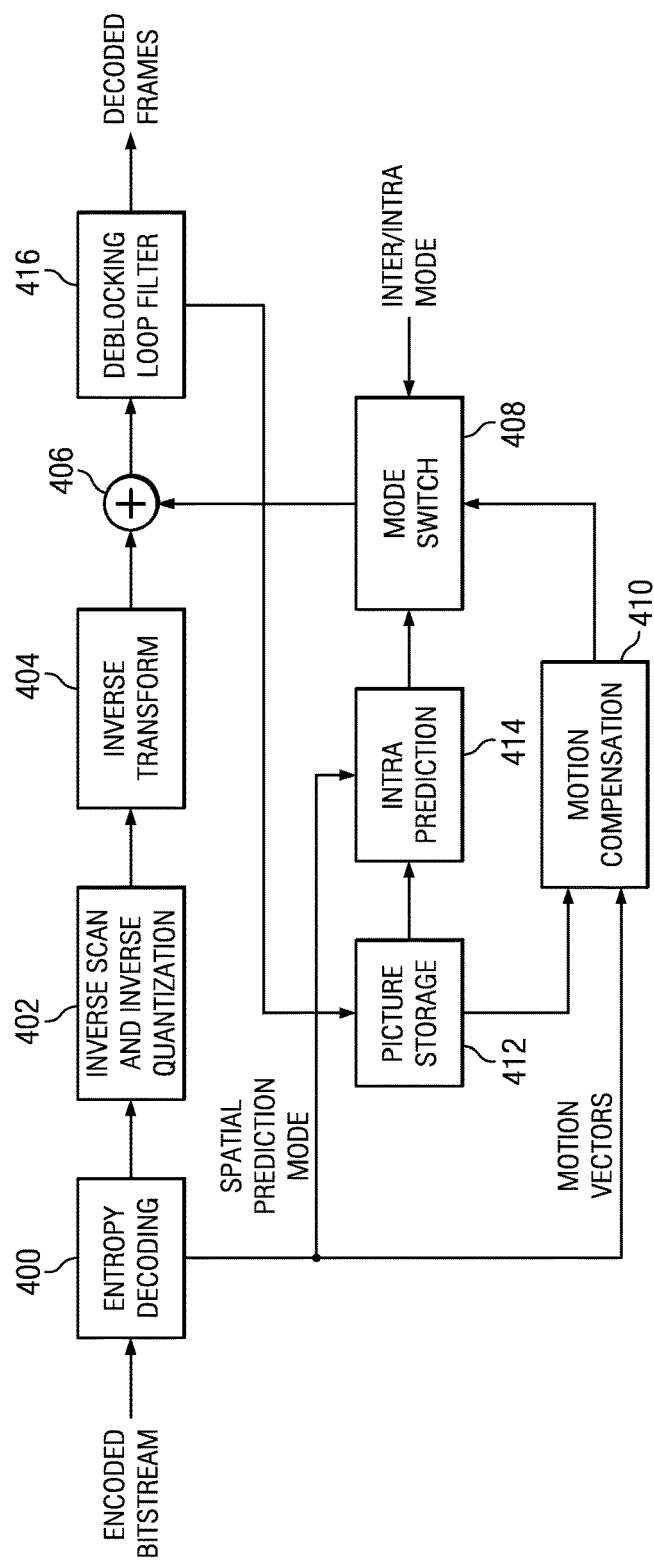
FIG. 4 is a block diagram of a video decoder.

FIG. 4 shows a block diagram of an example video decoder. The video decoder operates to reverse the encoding operations, i.e., entropy coding, quantization, transformation, and prediction, performed by the video encoder of FIG. 3 to regenerate the pictures of the original video sequence. In view of the above description of a video encoder, one of ordinary skill in the art will understand the functionality of components of the video decoder without detailed explanation.

The entropy decoding component 400 receives an entropy encoded (compressed) video bit stream and reverses the entropy coding to recover the encoded syntax elements and provides the syntax elements to the appropriate component. The entropy decoding component 400 decodes the syntax elements encoded in the bit stream using an embodiment of CABAC decoding with accelerated bypass bin processing as described herein.

The inverse scan and inverse quantization component 402 receives entropy decoded quantized transform coefficients from the entropy decoding component 400, inverse scans the coefficients to return the coefficients to their original post-transform arrangement, i.e., performs the inverse of the scan performed by the scan component 308 of the encoder to reconstruct quantized transform blocks, and de-quantizes the quantized transform coefficients. The forward scanning in the encoder is a conversion of the two dimensional (2D) quantized transform block to a one dimensional (1D) sequence; the inverse scanning performed here is a conversion of the 1D sequence to the two dimensional quantized transform block.

The inverse transform component 404 transforms the frequency domain data from the inverse scan and inverse quantization component 402 back to the residual CU. That is, the inverse transform component 404 applies an inverse unit transform, i.e., the inverse of the unit transform used for encoding, to the de-quantized residual coefficients to produce the residual CUs.

A residual CU supplies one input of the addition component 406. The other input of the addition component 406 comes from the mode switch 408. When an inter-prediction mode is signaled in the encoded video stream, the mode switch 408 selects predicted PUs from the motion compensation component 410 and when an intra-prediction mode is signaled, the mode switch selects predicted PUs from the intra-prediction component 414.

The motion compensation component 410 receives reference data from storage 412 and applies the motion compensation computed by the encoder and transmitted in the encoded video bit stream to the reference data to generate a predicted PU. That is, the motion compensation component 410 uses the motion vector(s) from the entropy decoder 400 and the reference data to generate a predicted PU.

The intra-prediction component 414 receives reference data from previously decoded PUs of a current picture from the picture storage 412 and applies the intra-prediction computed by the encoder as signaled by the intra-prediction mode transmitted in the encoded video bit stream to the reference data to generate a predicted PU.

The addition component 406 generates a decoded CU by adding the predicted PUs selected by the mode switch 408 and the residual CU. The output of the addition component 406 supplies the input of the in-loop filter component 416. The in-loop filter component 416 performs the same filtering as the encoder. The output of the in-loop filter component 416 is the decoded pictures of the video bit stream. Further, the output of the in-loop filter component 416 is stored in storage 412 to be used as reference data.

Figure 5:
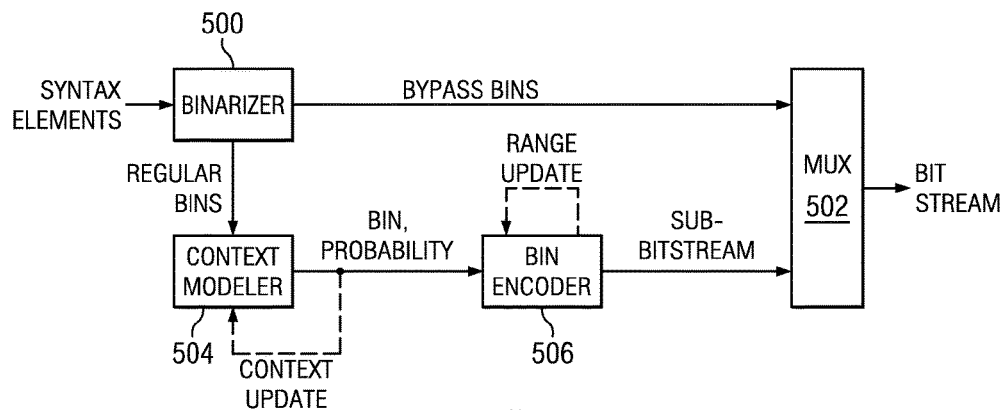
FIG. 5 is a block diagram of a CABAC encoder with accelerated bypass bin processing.

FIG. 5 is a block diagram of a CABAC encoder with accelerated bypass bin processing. The binarizer 100 converts syntax elements into strings of one or more binary symbols. As was previously discussed, a bin may be either a context-coded (regular) bin or a bypass bin. If a bin is a context-coded bin, the bin is passed to the context modeler 504. In some embodiments, the context-coded bins are buffered (not shown) as they are generated by the binarizer 500 and the context modeler 504 accesses the bins from the buffer in first-in-first-out (FIFO) order. If a bin is a bypass bin, the bin is passed directly to the bit stream multiplexer 502.

The context modeler 504 and the bin encoder 506 operate as previously described in reference FIG. 1A to encode each context-encoded bin. Note that the bin encoder 506 does not need to include the simplified arithmetic encoding and renormalization for the prior art bypass mode. The bit values generated by the bin encoder 506 are provided as a sub-bitstream to the bit stream multiplexer 502.

Figure 6:
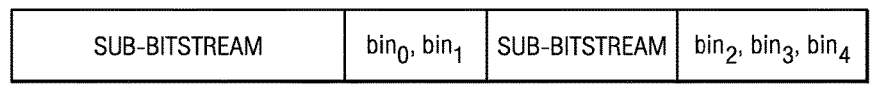
FIG. 6 is an example of a compressed video bit stream composed of a sub-bitstream multiplexed with bypass bins.

The bit stream multiplexer 502 combines the bypass bins with the sub-bitstream produced by the bin encoder 506 to generate the compressed video bit stream. FIG. 6 shows a general example of the multiplexing of the sub-bitstream with the bypass bits. As was previously mentioned, in arithmetic coding, the encoded bits of the compressed video bit stream serve as offset pointers used to select between two intervals that represent the probability of the bin to be decoded. The encoder ensures that each offset has sufficient bit accuracy to allow the decoder to correctly select an interval and correctly decode the bins. In HEVC CABAC, the required bit accuracy is 9 bits. The multiplexing scheme used by the bit stream multiplexer 502 ensures that sub-bitstream and the bypass bins are combined in a manner that maintains the needed accuracy of the offset values.

More specifically, the bit stream multiplexer 502 receives the bits of the sub-bitstream and outputs these bits into the compressed video bit stream until a bypass bin is received from the binarizer 500. At that point, the bit stream multiplexer 502 begins counting the number of bits of the sub-bitstream that are output into the compressed bit stream. The bit stream multiplexer 502 also begins buffering the bypass bins received. When the bit stream multiplexer 502 has output 9 bits from the sub-bitstream (from the point where the initial bypass bin was received), it then outputs the bypass bins stored in the bypass bin buffer into the compressed video bit stream. The number of bypass bins received by the multiplexer 502 in this interval depends on the sequence of syntax elements being encoded. The bit stream multiplexer 502 then resumes outputting the bits of the sub-bitstream until the next bypass bin is received, at which point the counting of output bits from the sub-bitstream and buffering of bypass bins is repeated.

For example, assume three consecutive syntax elements A, B and C of value 5, 6 and 7 with binarized values of 11_1110, 1_111110, and 1_1111110, respectively, where the first two bins of A, the first bin of B, and the first bin of C are context-coded bins and the remaining bins of all three are bypass bins. The first two bins of syntax element A (11) are coded in regular coding mode, and any bits output during renormalization are written into the compressed video bit stream by the bit stream multiplexer 502. When the bit stream multiplexor 502 receives the bypass bins of syntax element A (1110), they are stored in the bypass buffer. Subsequently, the first bin of syntax element B is coded in regular coding mode. If the coding of this bin requires renormalization of 9 bits or more, the multiplexer 502 writes the initial 9 bits into the compressed video bit stream and then writes the buffered bypass bin (1110) into the compressed video bit stream. After the bypass bins are written, the multiplexer 502 writes any remaining bits from the regular coding of the first bin of syntax element B into the compressed video bit stream.

If the coding of the first bin of syntax element B requires renormalization of fewer than 9 bits, e.g., 5 bits, the multiplexer 502 adds the bypass bins of syntax element B (111110) to the bypass buffer after the syntax element A bypass bins. At this point, five bits from the regular encoding of the first bin of syntax element B have been output in the compressed video bit stream. Next, the first bin of syntax element C is coded in regular coding mode. If coding of this bin requires renormalization of 9−5=4 bits or more, the multiplexer 502 writes four bits from the renormalization into the compress video bit stream and then writes the buffered bypass bins from syntax element A and syntax element B into the compressed video bit stream. After the bypass bins are written, the multiplexer 502 writes any remaining bits from the regular coding of the first bin of syntax element C into the compressed video bit stream.

Figure 7:
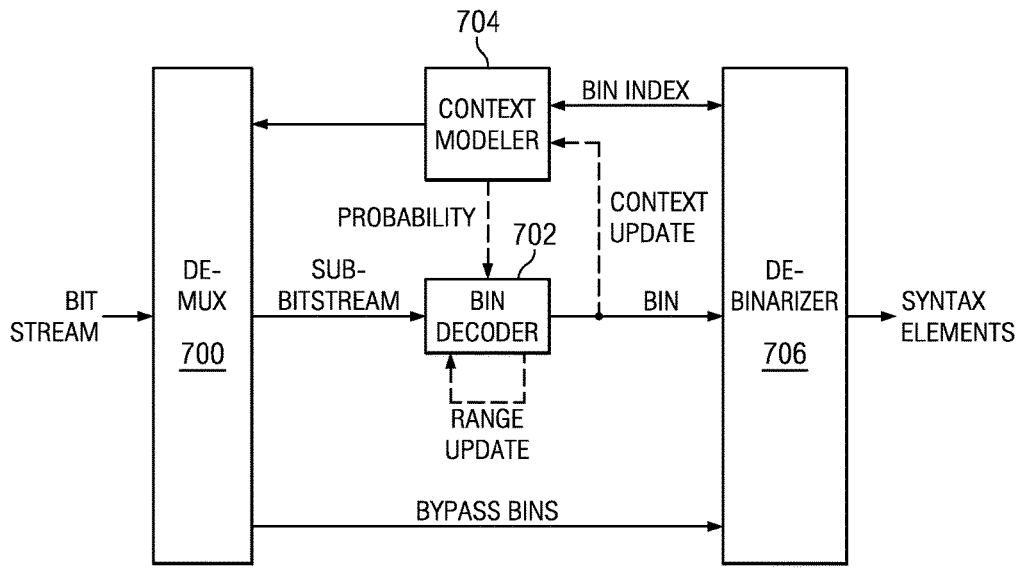
FIG. 7 is a block diagram of a CABAC decoder with accelerated bypass bin processing.

FIG. 7 is a block diagram of a CABAC decoder with accelerated bypass bin processing. The input to this decoder is a compressed video bit stream in which a sub-bitstream from the arithmetic coding of context-coded bins is multiplexed with bypass bins written directly into the compressed bit stream as described in reference to FIG. 5. The bit stream de-multiplexer 700 receives the compressed video bit stream and directs the bit stream to bin decoder 702 or the de-binarizer 706 upon request.

More specifically, the de-binarizer 706 and context modeler 704 operate together to determine whether the next bin to be decoded comes from directly written bypass bins or from the sub-bitstream of context-coded bins. The order in which syntax elements should occur in the compressed video bit stream is known, so the type of each syntax element to be decoded can be determined prior to decoding based on the types of previously decoded syntax elements. Further, for each syntax element, the type of each bin in the syntax element is known. Given the type of the syntax element being decoded and which bin in the syntax element is the next to be decoded, the debinarizer/context selection logic can determine whether the next bin is context coded or bypass coded and request the bit stream de-multiplexer 700 to direct the bit stream into the appropriate channel, i.e., directly to the de-binarizer 706 or to the bin decoder. The de-binarizer 706 determines the bin index of the bin to be decoded, and the context modeler 704 determines whether the bin is context coded or bypass coded given the bin index. For example, for a coefficient level syntax element, the de-binarizer 706 determines whether the bin index is 0, 1 or greater, and the context modeler 704 indicates that bins with the bin index of 0 and 1 for a coefficient level will be context coded, while bins with a bin index greater than 1 will by context coded.

The context modeler 704 and the bin decoder 702 operate as previously described in reference to FIG. 1B to decode each context-encoded bin from the sub-bitstream. Note that the bin decoder 702 does not need to include the simplified arithmetic decoding and renormalization for the prior art bypass mode. The bins generated by the bin decoder 702 are provided to the de-binarizer 706.

The de-binarizer 706 receives decoded bins for a syntax element from the bin decoder 702 and corresponding bypass bins for the syntax element and operates to reverse the binarization of the encoder to reconstruct the syntax element. Given the type of the syntax element, the de-binarizer 706 knows when and how many bypass bins to request from the de-multiplexer 700. Note that because the bypass bins do not go through the arithmetic coder, they are processed at a fast rate as many of them can be read in one cycle, e.g., 32 bypass bins in one cycle.

FIGS. 8A-8D are flow diagrams of a method for CABAC encoding with accelerated bypass bin processing. The method assumes an input stream of binarized syntax elements. In general, in this method, context-coded bins are coded into a sub-bitstream using the regular binary arithmetic coding of CABAC. Bypass bins are buffered and are multiplexed with the sub-bitstream to generate a compressed video bit stream. A bypass coding flag, bypassFlag, is used to trigger the multiplexing of buffered bypass bins with the sub-bitstream.

A bin is received 800 from the binarization processing. If the bin is a bypass bin 802, then the bypass coding flag, bypassFlag is checked. If the bypassFlag is true 804, the bypass bin is stored 808 in a bypass buffer and processing continues with the next bin 800. If the bypass coding flag is false 804, the current bypass bin triggers a process to multiplex one or more bypass bins with the sub-bitstream generated from encoding of context-coded bins. The bypassFlag is set to true and a bitCounter used in the multiplexing process to count output bits from the sub-bitstream is initialized to zero 806. The bypass bin is then stored in the bypass buffer 808 and processing continues with the next bin 800.

If the received bin is not a bypass bin 802, i.e., it is a context-coded bin, the bin is coded using the regular arithmetic coding process. A context model is determined 810 for the context-coded bin, and the probability interval of the bin is determined 812 using the selected context model. Selection of context models for context-coded bins and determining of probability ranges is previously described herein. The context model is also updated once the probability interval is determined.

Figure 8A:
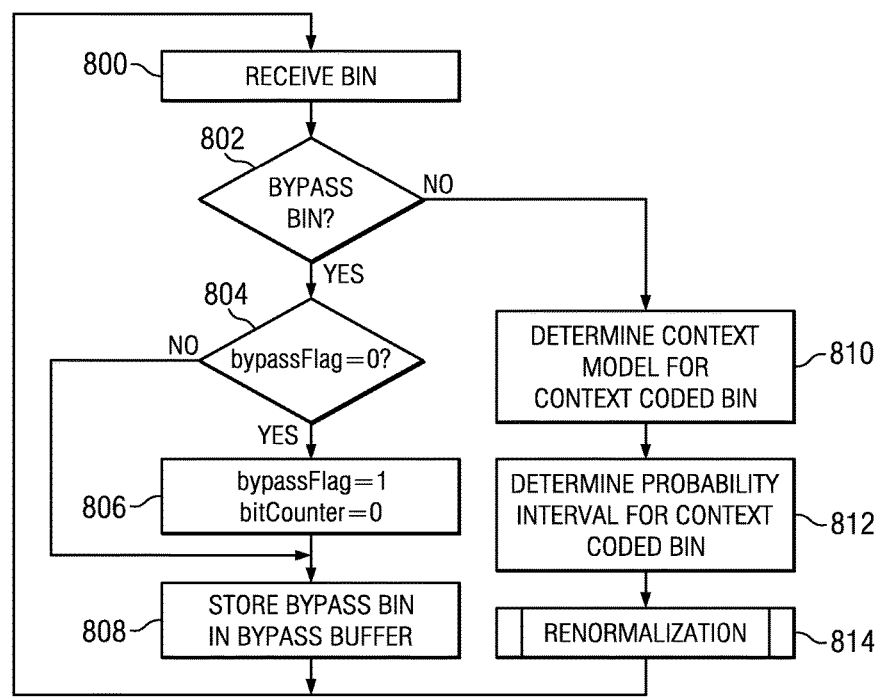
FIGS. 8A-8D are flow diagrams of a method for CABAC encoding with accelerated bypass bin processing.
Figure 8B:
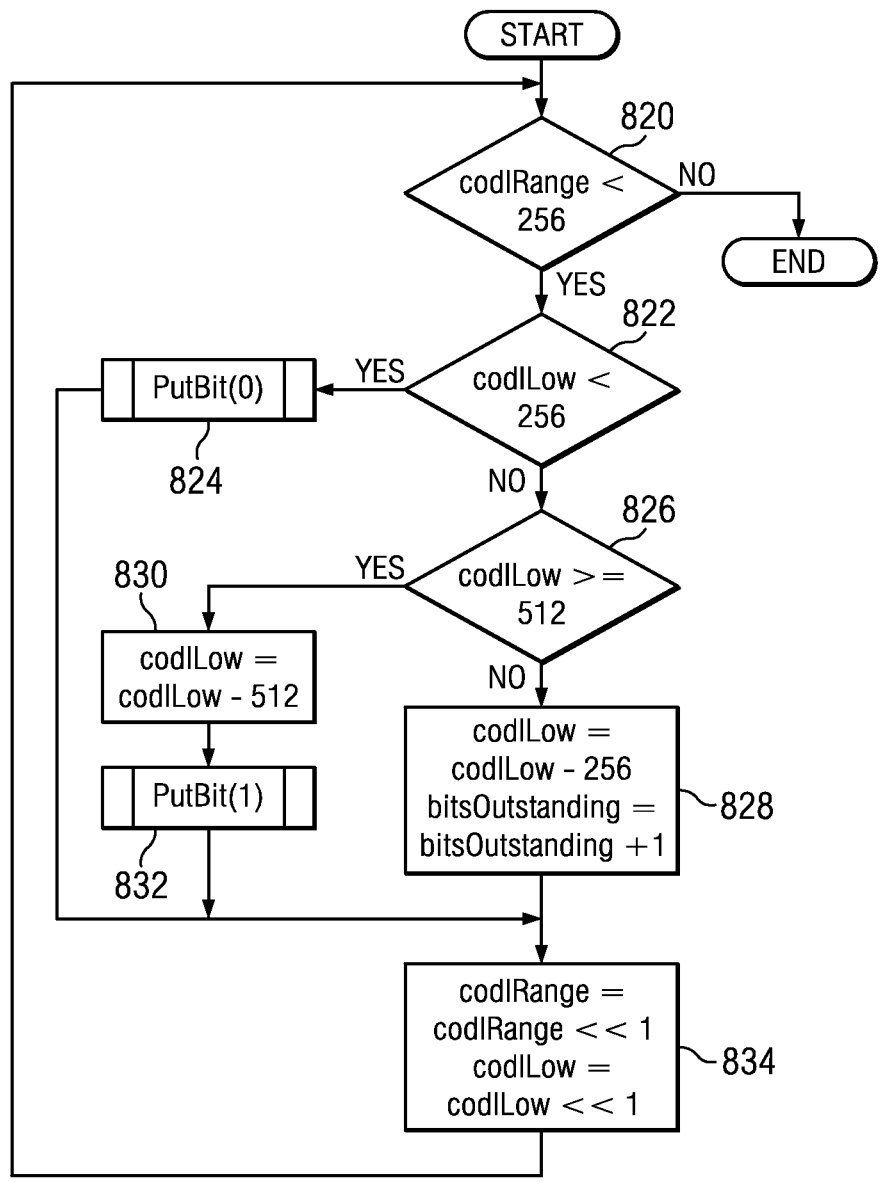

As was previously described, the current internal state of the arithmetic coding is represented by the lower bound of the current interval and the width (range) of the internal. Further, the bit precision of the lower bound of current interval is 10 bits and the bit precision of the range is 9 bits. Renormalization 814 is performed to rescale the lower bound and range as needed to maintain this precision and to generate the output bits of the arithmetic coding. FIG. 8B is a flow diagram of a renormalization method. In this method, codIRange is the range of the interval selected for the context-coded bin, codILow is the lower bound of the interval, and bitsOutstanding is a count of the outstanding bits. Outstanding bits are previously described herein.

The renormalization method generally involves restricting the nine bit codIRange value and the 10 bit codILow value to specific ranges. If the codIRange value falls within a 0-255 range 820, the codIRange value is pushed into a 256-511 range by multiplying 834 the codIRange value by 2 repeatedly (e.g., in N iterations). In each of the N iterations, the codiLow value is also multiplied 834 by 2. In each of the N iterations, if the codILow value falls in the 256-511 range 826, the codILow value is reduced 828 by 256 and bitsOutstanding is incremented. If the codILow value falls in the 512-1023 range 826, the codILow value is reduced 830 by 512 while outputting 832 a "1" to the compressed video bit stream. If the codILow value falls in the 0-255 range 822, the codILow value is multiplied 834 by 2 while outputting 824 a "0" to the compressed video bit stream.

Figure 8C:
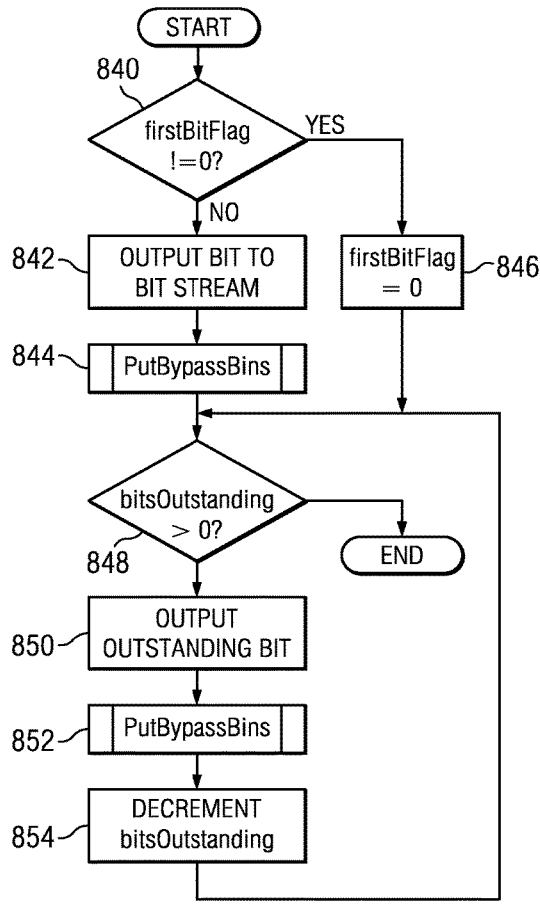

In the renormalization method, a PutBit method 824, 832 is used to add the output bits from renormalization to the compressed video bitstream. FIG. 8C is a flow diagram of the PutBit method. The input to this method is the output bit of a renormalization iteration. In general, this method outputs the bit to the compressed video bit stream followed by any outstanding bits. After each bit is output, a PutBypassBins method is executed to multiplex in buffered bypass bins at the appropriate point.

As shown in FIG. 8C, if the firstBitFlag is false 840, the bit is output 842 to the compressed video bit stream. The PutBypassBins method is then executed 844. If there are any outstanding bits 848, these bits are incrementally output 848-854 to the compressed video bit stream. The PutBypassBins method is executed 852 after each outstanding bit is output. The value of each outstanding bit output is the opposite of the value of bit from the renormalization iteration. That is, if the output bit from the renormalization iteration is "1", the value of each outstanding bit will be "0" and vice versa.

Figure 8D:
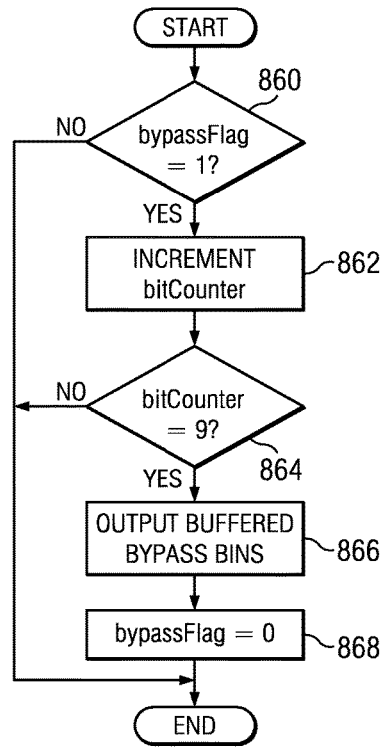

FIG. 8D is a flow diagram of the PutBypassBins method. If the bypassFlag is not true 860, the method terminates as there are no buffered bypass bins to be multiplexed. If the bypassFlag is true 860, there are one or more buffered bypass bins waiting to be multiplexed. The bitCounter is incremented 862 to reflect the bit added to the compressed video bit stream by the PutBit method.

If the bitCounter is not 9, the method terminates as the proper point for adding the buffered bypass bins to compressed video bitstream has not yet been reached. If the bitCounter is 9, the buffered bypass bins are output 866 to the compressed video bitstream and the bypassFlag is set to false 868.

Figure 9:
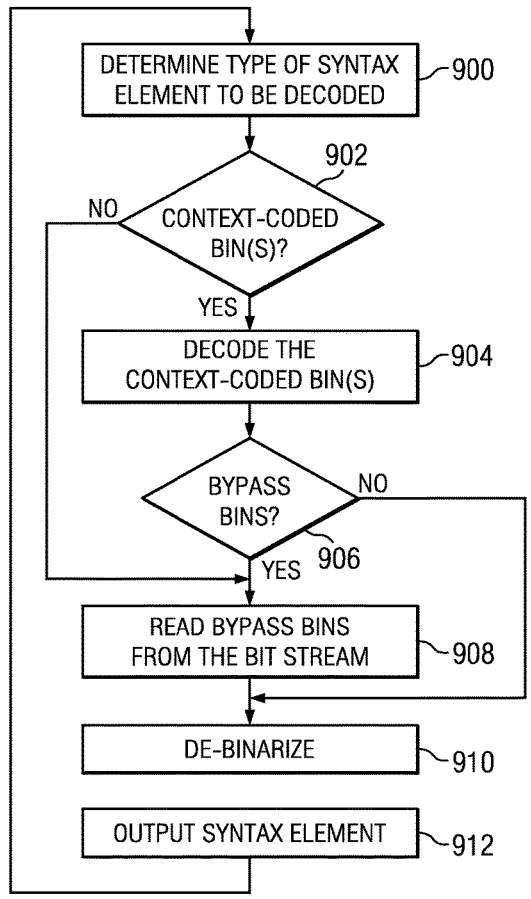
FIG. 9 is a flow diagram of a method for CABAC decoding with accelerated bypass bin processing.

FIG. 9 is a flow diagram of a method for CABAC decoding with accelerated bypass bin processing. This method assumes an input compressed video bit stream composed of bypass bins multiplexed with a sub-bitstream of encoded context-coded bins as previously described. Initially, the type of the next syntax bin to be decoded is determined 900. As was previously explained, the syntactic order of syntax elements in a compressed bit stream is known so the type of the next syntax element can be determined based on the type(s) of previously decoded syntax elements.

If the initial bin or bins of the syntax element are context coded 902, the bin or bins are decoded 904 from the sub-bitstream in regular decoding mode, i.e., using binary arithmetic decoding. If the syntax element also includes bypass bins 906, the bypass bins are read 908 directly from the compressed video bit stream. Note that because of the manner in which the sub-bitstream and the bypass bins are multiplexed, the decoder knows that the bypass bins for a syntax element are located 9 bits after the most significant bit of the current offset in the compressed bit stream. Further, once the decoder has read the bypass bins, it will use the current offset to begin the decoding of the context-coded bins of the next syntax element having context-coded bins. The string of decoded context-coded bins and directly read bypass bins is then de-binarized 910 to generate the value of the syntax element. The syntax element is output 912 and the process continues with the next syntax element.

If the syntax element does not include bypass bins 906, the decoded context-coded bin or bins are de-binarized 910 to generate the value of the syntax element. The syntax element is output 912 and the process continues with the next syntax element.

If the syntax element does not include context-coded bins 902, then all of the bins in the syntax element are bypass bins. The bypass bins are read 908 directly from the compressed video bit stream and de-binarized 910 to generate the value of the syntax element. The syntax element is output 912 and the process continues with the next syntax element.

Figure 10:
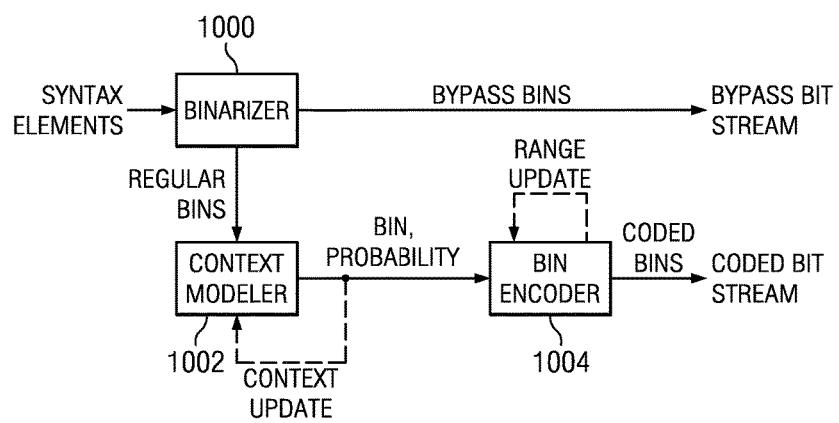
FIG. 10 is a block diagram of a CABAC encoder with accelerated bypass bin processing.

FIG. 10 is a block diagram of a CABAC encoder with accelerated bypass bin processing. In this encoder, rather than multiplexing the bypass bins with a sub-bitstream from the bin decoder as in previously described embodiments, the bypass bins and the output of the bin decoder are written to separate bit streams, a bypass bit stream and a coded bit stream. This eliminates the need to buffer the bypass bins as in the previously described embodiments. These two bit streams may be combined to create the final compressed video bit stream. For example, the bit streams may be arranged sequentially in the compressed video bit stream with an added marker or a pointer (entry point) to indicate the start of each bit stream, e.g., the coded bit stream could be sent before the bypass bit stream and a marker to the beginning of the compressed video bit stream would indicate where the bypass bit stream started.

As shown in FIG. 10, the binarizer 1000 converts syntax elements into strings of one or more binary symbols. As was previously discussed, a bin may be either a context-coded (regular) bin or a bypass bin. If a bin is a context-coded bin, the bin is passed to the context modeler 1002. If a bin is a bypass bin, the bin is written directly to a bypass bit stream.

The context modeler 1002 and the bin encoder 1004 operate as previously described in reference FIG. 1A to encode each context-encoded bin. Note that the bin encoder 1004 does not need to include the simplified arithmetic encoding and renormalization for the prior art bypass mode. The bit values generated by the bin encoder 1004 are written to a coded bit stream.

Figure 11:
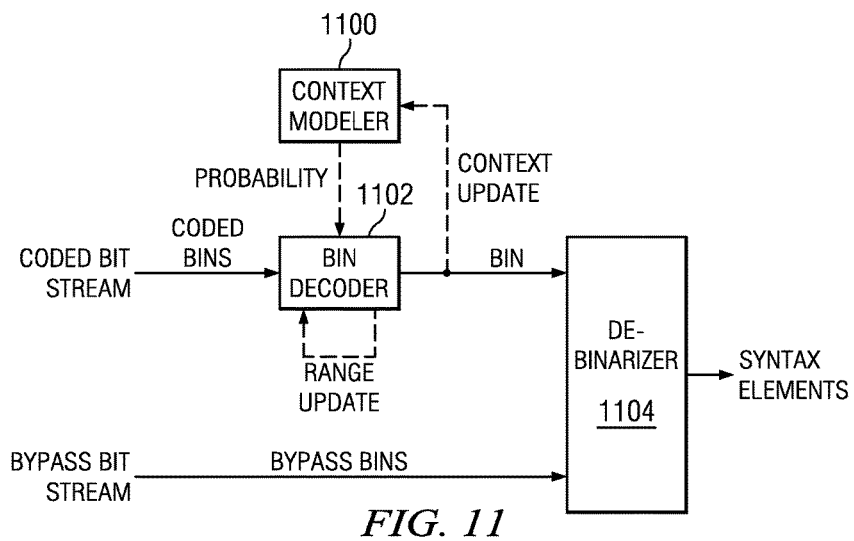
FIG. 11 is a block diagram of a CABAC decoder with accelerated bypass bin processing.

FIG. 11 is a block diagram of a CABAC decoder with accelerated bypass bin processing. The input to this decoder is a compressed video bit stream composed of a bypass bit stream and a coded bit stream as described in reference to FIG. 10. The bypass bit stream is passed directly to the de-binarizer 1104 and the coded bit stream is passed directly to the bin decoder 1102.

The context modeler 1100 and the bin decoder 1102 operate as previously described in reference to FIG. 1B to decode each context-encoded bin from the coded bit stream. Note that the bin decoder 1102 does not need to include the simplified arithmetic decoding and renormalization for the prior art bypass mode. The bins generated by the bin decoder 1102 are provided to the de-binarizer 1104.

The de-binarizer 1104 receives decoded bins for a syntax element from the bin decoder 1102 and reads corresponding bypass bins (if any) from the bypass bit stream for the syntax element and operates to reverse the binarization of the encoder to reconstruct the value of the syntax element. Given the type of the syntax element, the de-binarizer 1104 knows when and how many bypass bins to read from the bypass bit stream.

Figure 12:
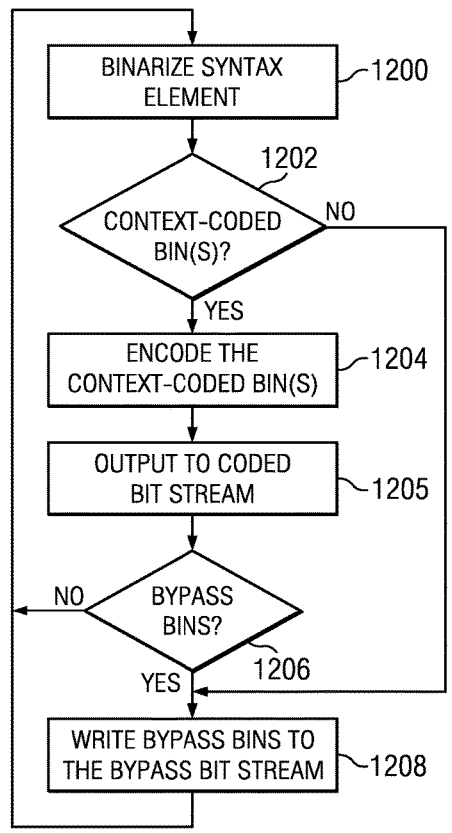
FIG. 12 is a flow diagram of a method for CABAC encoding with accelerated bypass bin processing.

FIG. 12 is a flow diagram of a method for CABAC encoding with accelerated bypass bin processing. In general, in this method, context-coded bins are coded into a coded bit stream using the regular binary arithmetic coding of CABAC and bypass bins are directly written into a bypass bit stream.

Initially, a syntax element is binarized 1200. If the syntax element does not include a context-coded bin 1202, the bypass bin(s) of the syntax element are written to the bypass bit stream 1208, and processing continues with the next syntax element. If the initial bin or bins of the syntax element are context coded 1202, the bin or bins are encoded 1204 in regular decoding mode, i.e., using binary arithmetic encoding, and any bits from the encoding process are output 1205 into the coded bit stream. If the syntax element also includes one or more bypass bins 1206, the bypass bin(s) are written to the bypass bit stream 1208, and processing continues with the next syntax element. If the syntax element does not include a bypass bin 1206, the process continues with the next syntax element.

Figure 13:
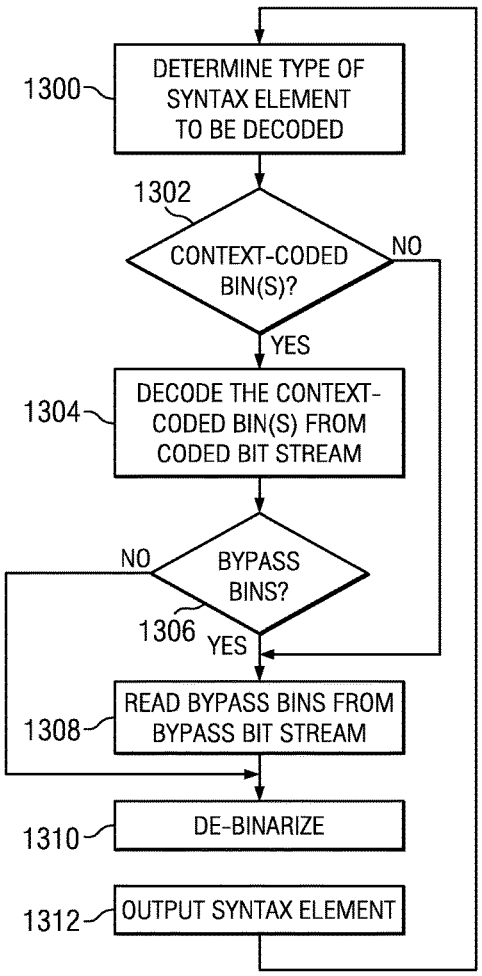
FIG. 13 is a flow diagram of a method for CABAC decoding with accelerated bypass bin processing.

FIG. 13 is a flow diagram of a method for CABAC decoding with accelerated bypass bin processing. This method assumes an input compressed video bit stream composed of a bypass bit stream and a coded bit stream as previously described. Initially, the type of the next syntax element to be decoded is determined 1300. If the initial bin or bins of the syntax element are context coded 1302, the bin or bins are decoded 1304 from the coded bit stream in regular decoding mode, i.e., using binary arithmetic decoding. If the syntax element also includes bypass bins 1306, the bypass bins are read 1308 directly from the bypass bit stream. The string of decoded context-coded bins and directly read bypass bins is then de-binarized 1310 to generate the value of the syntax element. The syntax element is output 1312 and the process continues with the next syntax element.

If the syntax element does not include bypass bins 1306, the decoded context-coded bin or bins are de-binarized 1310 to generate the value of the syntax element. The syntax element is output 1312 and the process continues with the next syntax element.

If the syntax element does not include context-coded bins 1302, then all of the bins in the syntax element are bypass bins. The bypass bins are read 1308 directly from the bypass bit stream and de-binarized 1310 to generate the value of the syntax element. The syntax element is output 1312 and the process continues with the next syntax element.

Figure 14:
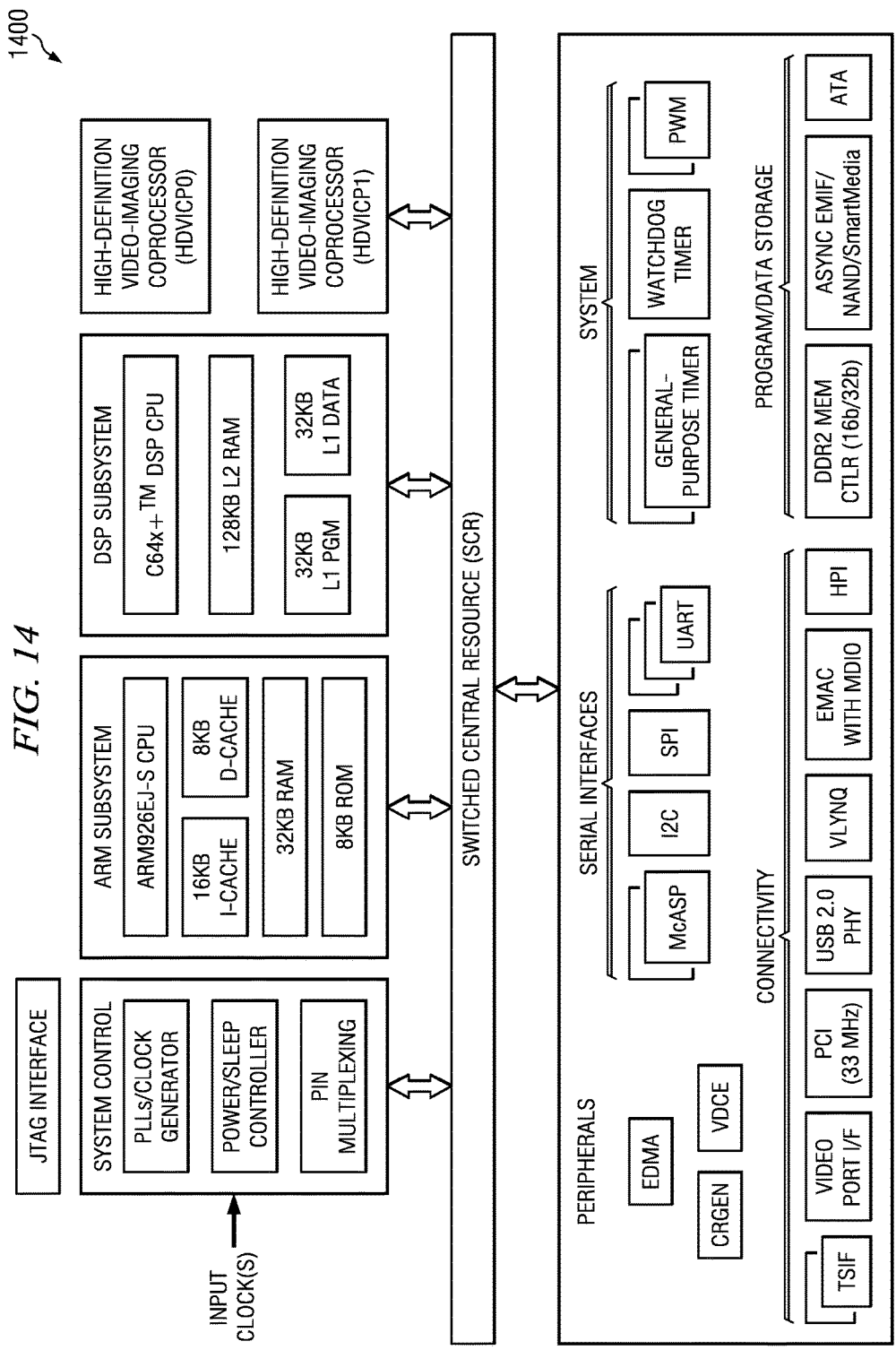
FIG. 14 is a block diagram of an illustrative digital system.

FIG. 14 is a block diagram of an example digital system suitable for use as an embedded system that may be configured to perform CABAC encoding with accelerated bypass bin processing during video encoding and/or to perform CABAC decoding with accelerated bypass bin processing during video decoding. This example system-on-a-chip (SoC) is representative of one of a family of DaVinci™ Digital Media Processors, available from Texas Instruments, Inc. This SoC is described in more detail in "TMS320DM6467 Digital Media System-on-Chip", SPRS403G, December 2007 or later, which is incorporated by reference herein.

The SoC 1400 is a programmable platform designed to meet the processing needs of applications such as video encode/decode/transcode/transrate, video surveillance, video conferencing, set-top box, medical imaging, media server, gaming, digital signage, etc. The SoC 1400 provides support for multiple operating systems, multiple user interfaces, and high processing performance through the flexibility of a fully integrated mixed processor solution. The device combines multiple processing cores with shared memory for programmable video and audio processing with a highly-integrated peripheral set on common integrated substrate.

The dual-core architecture of the SoC 1400 provides benefits of both DSP and Reduced Instruction Set Computer (RISC) technologies, incorporating a DSP core and an ARM926EJ-S core. The ARM926EJ-S is a 32-bit RISC processor core that performs 32-bit or 16-bit instructions and processes 32-bit, 16-bit, or 8-bit data. The DSP core is a TMS320C64x+TM core with a very-long-instruction-word (VLIW) architecture. In general, the ARM is responsible for configuration and control of the SoC 1400, including the DSP Subsystem, the video data conversion engine (VDCE), and a majority of the peripherals and external memories. The switched central resource (SCR) is an interconnect system that provides low-latency connectivity between master peripherals and slave peripherals. The SCR is the decoding, routing, and arbitration logic that enables the connection between multiple masters and slaves that are connected to it.

The SoC 1400 also includes application-specific hardware logic, on-chip memory, and additional on-chip peripherals. The peripheral set includes: a configurable video port (Video Port I/F), an Ethernet MAC (EMAC) with a Management Data Input/Output (MDIO) module, a 4-bit transfer/4-bit receive VLYNQ interface, an inter-integrated circuit (I2C) bus interface, multichannel audio serial ports (McASP), general-purpose timers, a watchdog timer, a configurable host port interface (HPI); general-purpose input/output (GPIO) with programmable interrupt/event generation modes, multiplexed with other peripherals, UART interfaces with modem interface signals, pulse width modulators (PWM), an ATA interface, a peripheral component interface (PCI), and external memory interfaces (EMIFA, DDR2). The video port I/F is a receiver and transmitter of video data with two input channels and two output channels that may be configured for standard definition television (SDTV) video data, high definition television (HDTV) video data, and raw video data capture.

As shown in FIG. 14, the SoC 1400 includes two high-definition video/imaging coprocessors (HDVICP) and a video data conversion engine (VDCE) to offload many video and image processing tasks from the DSP core. The VDCE supports video frame resizing, anti-aliasing, chrominance signal format conversion, edge padding, color blending, etc. The HDVICP coprocessors are designed to perform computational operations required for video encoding such as motion estimation, motion compensation, mode decision, transformation, and quantization. Further, the distinct circuitry in the HDVICP coprocessors that may be used for specific computation operations is designed to operate in a pipeline fashion under the control of the ARM subsystem and/or the DSP subsystem.

As was previously mentioned, the SoC 1400 may be configured to perform CABAC encoding with accelerated bypass bin processing as described herein when encoding a video stream and CABAC decoding with accelerated bypass bin processing as described herein when decoding a compressed video bit stream. For example, the coding control of the video encoder of FIG. 3 may be executed on the DSP subsystem or the ARM subsystem and at least some of the computational operations of the block processing, including intra-prediction, motion estimation, entropy encoding, and entropy decoding may be executed on the HDVICP coprocessors. Entropy encoding on the HDVICP coprocessors may implement techniques for CABAC encoding with accelerated bypass bin processing as described herein. Entropy decoding on the HDVICP coprocessors may implement techniques for CABAC decoding with accelerated bypass bin processing as described herein.

Other Embodiments

While the invention has been described with respect to a limited number of embodiments, those skilled in the art, having benefit of this disclosure, will appreciate that other embodiments can be devised which do not depart from the scope of the invention as disclosed herein.

For example, embodiments described herein assume that the precision of the range and the offset is 9 bits. One of ordinary skill in the art will appreciate embodiments with different precisions requirements for the range, offset and the rLPS table as the choice of precision may be a trade-off between computational efficiency and compression efficiency.

Embodiments of the methods, encoders, and decoders described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

It is therefore contemplated that the appended claims will cover any such modifications of the embodiments as fall within the true scope of the invention.

What is claimed is:

1. A method for encoding a video sequence in a video encoder to generate a compressed video bit stream, the method comprising:
   binarizing a plurality of syntax elements to produce a plurality of binarized syntax elements, the plurality of binarized syntax elements including one or more context-coded binary symbols (bins) and one or more bypass bins;
   encoding the context-coded bins of the binarized syntax elements using binary arithmetic encoding;
   adding the encoded context-coded bins to the compressed video bit stream; and
   adding the bypass bins of the binarized syntax elements to the compressed video bit stream without arithmetically encoding the bypass bins.

2. The method of claim 1,
   wherein the compressed video bit stream comprises a bypass bit stream and a coded bit stream, and
   wherein using binary arithmetic encoding comprises writing output of the binary arithmetic encoding of the context-coded bins to the coded bit stream, and
   wherein adding the bypass bins comprises writing the bypass bins to the bypass bit stream with no encoding.

3. The method of claim 1,
   wherein using binary arithmetic encoding comprises writing output of the binary arithmetic encoding to the compressed video bit stream, and
   wherein adding the bypass bins comprises:
   determining that a bin is a bypass bin;
   buffering the bypass bin in a bypass buffer; and
   writing the bypass bin from the bypass buffer to the compressed video bit stream when a predetermined number of bits is output by the binary arithmetic encoding of the context-coded bins after the bypass bin is buffered.

4. The method of claim 3, wherein the predetermined number of bits is nine.

5. The method of claim 3, wherein at least one more bypass bin is buffered in the bypass buffer before the predetermined number of bits is output.

6. The method of claim 5, wherein the bypass bin is comprised in a first binarized syntax element and the at least one more bypass bin is comprised in a second binarized syntax element.

7. The method of claim 1, wherein adding the bypass bins comprises multiplexing the bypass bins with a sub-bitstream output by the binary arithmetic encoding of the context-coded bins to generate the compressed video bit stream.

8. A method for decoding a compressed video bit stream in a video decoder, the method comprising:
   determining a type of a syntax element encoded in the compressed bit stream, wherein the encoded syntax element comprises a plurality of context-coded binary symbols (bins) and a plurality of bypass bins;
   reading the plurality of bypass bins from the compressed video bit stream with no decoding;
   decoding the plurality of context-coded bins from the compressed video bit stream using binary arithmetic decoding; and
   debinarizing the plurality of context-coded bins and the plurality of bypass bins to regenerate the syntax element.

9. The method of claim 8,
   wherein the compressed video bit stream comprises a bypass bit stream and a coded bit stream, and
   wherein using binary arithmetic decoding comprises reading bits from the coded bit stream, and
   wherein reading the plurality of bypass bins comprises reading bypass bins from the bypass bit stream.

10. The method of claim 8,
wherein using binary arithmetic decoding comprises reading bits corresponding to a binary arithmetic encoding of the context-coded bins from the compressed video bit stream, and
wherein reading the plurality of bypass bins comprises:
determining that a next bin to be decoded is a bypass bin; and
reading the bypass bin from a location in the compressed video bit stream that is a predetermined number of bits after a most significant bit of a current offset of the binary arithmetic decoding.

11. The method of claim 10, wherein the predetermined number of bits is nine.

12. The method of claim 8, wherein the compressed video bit stream comprises bypass bins of a plurality of binarized syntax elements multiplexed with a sub-bitstream of binary arithmetic encoded context-coded bins of the plurality of binarized syntax elements.

13. A video coding apparatus comprising:
a processor; and
a memory coupled to the processor, wherein the memory is configured to store instructions that, when executed by the processor, cause the processor to:
binarize a plurality of syntax elements to produce a plurality of binarized syntax elements, the plurality of binarized syntax elements including one or more context-coded binary symbols (bin) and one or more bypass bins;
encode the context-coded bins of the binarized syntax elements using binary arithmetic encoding;
add the encoded context-coded bins to a compressed video bit stream; and
add the bypass bins of the binarized syntax elements to the compressed video bit stream without arithmetically encoding the bypass bins.

14. The video coding apparatus of claim 13,
wherein the compressed video bit stream includes a bypass bit stream and a coded bit stream, and
wherein using binary arithmetic encoding includes writing output of the binary arithmetic encoding of the context-coded bins to the coded bit stream, and
wherein the instructions that cause the processor to add the bypass bins include instructions that cause the processor to add the bypass bins to the bypass bit stream with no encoding.

15. The video coding apparatus of claim 13,
wherein using binary arithmetic encoding comprises writing output of the binary arithmetic encoding to the compressed video bit stream, and
wherein the instructions that cause the processor to add the bypass bins include instructions that cause the processor to:
determine that a bin is a bypass bin;
buffer the bypass bin in a bypass buffer; and
write the bypass bin from the bypass buffer to the compressed video bit stream when a predetermined number of bits is output by the binary arithmetic encoding of the context-coded bins after the bypass bin is buffered.

16. The video coding apparatus of claim 15, wherein the predetermined number of bits is nine.

17. The video coding apparatus of claim 15, wherein at least one more bypass bin is buffered in the bypass buffer before the predetermined number of bits is output.

18. The video coding apparatus of claim 17, wherein the bypass bin is comprised in a first binarized syntax element and the at least one more bypass bin is comprised in a second binarized syntax element.

19. The video coding apparatus of claim 13, wherein the instructions that cause the processor to add the bypass bins include instructions that cause the processor to multiplex the bypass bins with a sub-bitstream output by the binary arithmetic encoding of the context-coded bins to generate the compressed video bit stream.

\* \* \* \* \*